United States Patent
D'Amato et al.

(10) Patent No.: US 9,723,290 B2
(45) Date of Patent: Aug. 1, 2017

(54) METHOD FOR GENERATING, TRANSMITTING AND RECEIVING STEREOSCOPIC IMAGES AND RELATING DEVICES

(71) Applicant: S.I.SV.EL SOCIETA' ITALIANA PER LO SVILUPPO DELL'ELETTRONICA S.P.A., None (TO) (IT)

(72) Inventors: Paolo D'Amato, Rome (IT); Giovanni Ballocca, Turin (IT); Fedor Bushlanov, Tomsk (RU); Alexey Polyakov, Tomsk (RU)

(73) Assignee: S.I.SV.EL Societa' Italiana Per Lo Sviluppo Dell'elettronica S.P.A., None (IT)

( * ) Notice: Subject to any disclaimer, the term of this patent is extended or adjusted under 35 U.S.C. 154(b) by 192 days.

(21) Appl. No.: 14/426,649

(22) PCT Filed: Mar. 6, 2013

(86) PCT No.: PCT/IB2013/051782
§ 371 (c)(1),
(2) Date: Mar. 6, 2015

(87) PCT Pub. No.: WO2014/037822
PCT Pub. Date: Mar. 13, 2014

(65) Prior Publication Data
US 2015/0215599 A1    Jul. 30, 2015

(30) Foreign Application Priority Data
Sep. 6, 2012    (RU) .................................. 2012138174

(51) Int. Cl.
*H04N 13/00* (2006.01)
*G06K 9/00* (2006.01)

(52) U.S. Cl.
CPC ....... *H04N 13/004* (2013.01); *H04N 13/0022* (2013.01); *H04N 13/0037* (2013.01);
(Continued)

(58) Field of Classification Search
CPC ............. H04N 13/004; H04N 13/0022; H04N 13/0037; H04N 2013/0081; H04N 2013/0077; H04N 13/0048; H04N 13/0066
(Continued)

(56) References Cited

U.S. PATENT DOCUMENTS

2012/0063634 A1*    3/2012    Doerr .................... G06T 1/005
                                                                 382/100

FOREIGN PATENT DOCUMENTS

WO    2011/077343 A1    6/2011
WO    2012/014171 A1    2/2012

OTHER PUBLICATIONS

International Preliminary Report on Patentability dated Mar. 10, 2015, issued in PCT Application PCT/IB2013/051782, filed Feb. 2, 2012.
(Continued)

*Primary Examiner* — Hee-Yong Kim
(74) *Attorney, Agent, or Firm* — Workman Nydegger

(57) ABSTRACT

A method for generating a stereoscopic video stream (101) having composite images (C) that include information about a right image (R) and a left image (L), as well as at least one depth map includes pixels from the right image (R) and from the left image (L), and then entering the selected pixels into a composite image (C) of the stereoscopic video stream. The method also provides for entering all the pixels of the right image (R) and all the pixels of the left image (L) into the composite image (C) by leaving one of said two images unchanged and breaking up the other one into regions (R1, (Continued)

R2, R3) having a plurality of pixels. The pixels of the depth map(s) are then entered into that region of the composite image which is not occupied by pixels of the right and left images.

18 Claims, 7 Drawing Sheets

(52) U.S. Cl.
CPC ..... *H04N 13/0048* (2013.01); *H04N 13/0066* (2013.01); *H04N 2013/0077* (2013.01); *H04N 2013/0081* (2013.01); *H04N 2213/003* (2013.01); *H04N 2213/005* (2013.01)

(58) Field of Classification Search
USPC .......................................................... 348/42
See application file for complete search history.

(56) References Cited

OTHER PUBLICATIONS

Aljoscha Smolic et al., *Development of a New MPEG Standard for Advanced 3D Video Applications*, Proceedings of the 6th International Symposium on Image and Signal Processing and Analysis, Sep. 16, 2009, pp. 400-407.
International Search Report dated Jun. 26, 2013, issued in PCT Application No. PCT/IB2013/051782, filed Feb. 2, 2012.

* cited by examiner

METHOD FOR GENERATING, TRANSMITTING AND RECEIVING STEREOSCOPIC IMAGES AND RELATING DEVICES

FIELD OF THE INVENTION

The present invention concerns the generation, storage, transmission, reception and reproduction of stereoscopic video streams, i.e., video streams which, when appropriately processed in a visualization device, produce sequences of images which are perceived as being three-dimensional by a viewer.

BACKGROUND ART

As known, the perception of three-dimensionality can be obtained by reproducing two images, one for the viewer's right eye and the other for the viewer's left eye.

A stereoscopic video stream therefore transports information about two sequences of images, corresponding to the right and left perspectives of an object or a scene. Such a stream can also transport supplementary information.

International patent application PCT/IB2010/055918, published on 30 Jun. 2011 as WO2011/077343A1, describes a left/right image multiplexing method and a demultiplexing method (as well as related devices) which allow to preserve the balance between horizontal and vertical resolution, thus offering advantages over known techniques such as "side by side" and "top and bottom".

According to said multiplexing method, the pixels of the first image (e.g., the left image) are entered into the composite image unchanged, whereas the second image is divided into regions whose pixels are arranged in free areas of the composite image, as shown in FIG. 1, which shows the case wherein two so-called 720p images are entered into a container frame 1080p.

In reception, the image divided into regions is reconstructed and then sent to the display. For examples, displays are known which operate in accordance with the so-called "frame alternate" principle, i.e., showing the two images L and R in temporal succession. For stereoscopic vision, so-called "active" glasses must be worn, i.e., glasses which, synchronized with the succession of images L and R, shade one lens and keep the lens of the other eye open, so that each eye can only see the image intended for it.

It is known that stereoscopic vision through such displays can prove annoying for some viewers, to whom it would be desirable to offer the possibility of varying (decreasing) the depth of the images so as to adapt it to their subjective preferences and to the size of the screen. To do so, it is necessary to provide, within the display, a synthesis of intermediate images between those being transmitted, which will then be displayed in the place of the actually transmitted images. Such a reconstruction can be done, by using known techniques, if one or more depth maps associated with the transmitted images are available.

Furthermore, so-called self-stereoscopic displays have recently begun to appear on the market, which do not require the use of glasses. Also such displays carry out a synthesis of non-transmitted images, and therefore require at least one depth map providing the information necessary for such synthesis.

It has thus become necessary to introduce a new format for generating, transporting and reconstructing stereoscopic streams, which format can be used for traditional 2D reception and reproduction devices and for current two-view stereoscopic 3D reception and reproduction devices (with or without depth adjustment), as well as for future self-stereoscopic devices using more than two views, while at the same time preserving the utmost compatibility of the format with the video stream production and distribution infrastructures and devices currently in use.

BRIEF DESCRIPTION OF THE INVENTION

It is therefore the object of the present invention to propose a method for generating, transmitting and receiving stereoscopic images, and related devices, aimed at fulfilling the above-described requirements.

The invention relates to a method and a device for multiplexing the two images relating to the right and left perspectives (hereafter referred to as right image and left image), as well as one or more depth maps, within a single composite frame.

The invention also relates to a method and a device for demultiplexing said composite image, i.e., for extracting therefrom the right and left images and the depth map(s) entered by the multiplexing device.

As can be seen in FIG. 1a, pertaining to the above-mentioned international patent application (the so-called "tile format"), in the composite image there is an unused region (C5) whose dimensions are half, both horizontally and vertically, of those of the two images L and R. According to one possible embodiment of the invention, at least one depth map (DM) can be entered into said unused region, as shown in FIG. 1b.

A depth map relating to an image x is to be understood as a grayscale image wherein each pixel has a luminance value which is proportional to the depth, i.e., the coordinate "z", of the pixel itself, where by convention it is assumed that the value z=0 corresponds to the position on the screen, and positive values of z correspond to pixels positioned behind the screen, while negative values correspond to pixels positioned in front of the screen. Since the unused region of the composite image has horizontal and vertical dimensions which are half the dimensions of the images L and R, in one embodiment of the present invention it is possible to enter into such region a depth map (relating to one of the two images L and R) having horizontal and vertical resolution equal to half the corresponding image. It has been observed that such a loss of resolution is not detrimental because, given the inaccuracy with which depth maps can generally be calculated or measured, it is preferable to subject full-resolution maps to undersampling operations by making interpolations between the pixel values, in that such operations can reduce the noise component, resulting in reconstructed images of higher quality.

According to other embodiments of the invention, it is possible to enter two depth maps into said unused region (C5).

The above-mentioned international patent application also describes other forms of multiplexing and demultiplexing of the stereoscopic images L and R, to which the method of the present invention can be applied as well, although less effectively because the space left available for entering the depth map is smaller. Consequently, there will be a further reduction of the resolution of said map. While still falling within the general principles of the present invention, such alternative implementations will not be described herein.

It is a particular object of the present invention to provide a method for generating, transmitting and receiving stereoscopic images, and related devices, as set out in the appended claims, which are an integral part of the present description.

BRIEF DESCRIPTION OF THE DRAWINGS

Further objects and advantages of the present invention will become more apparent from the following description of a few embodiments thereof, which are supplied by way of non-limiting example with reference to the annexed drawings, wherein.

DETAILED DESCRIPTION OF THE INVENTION

Figure 2:
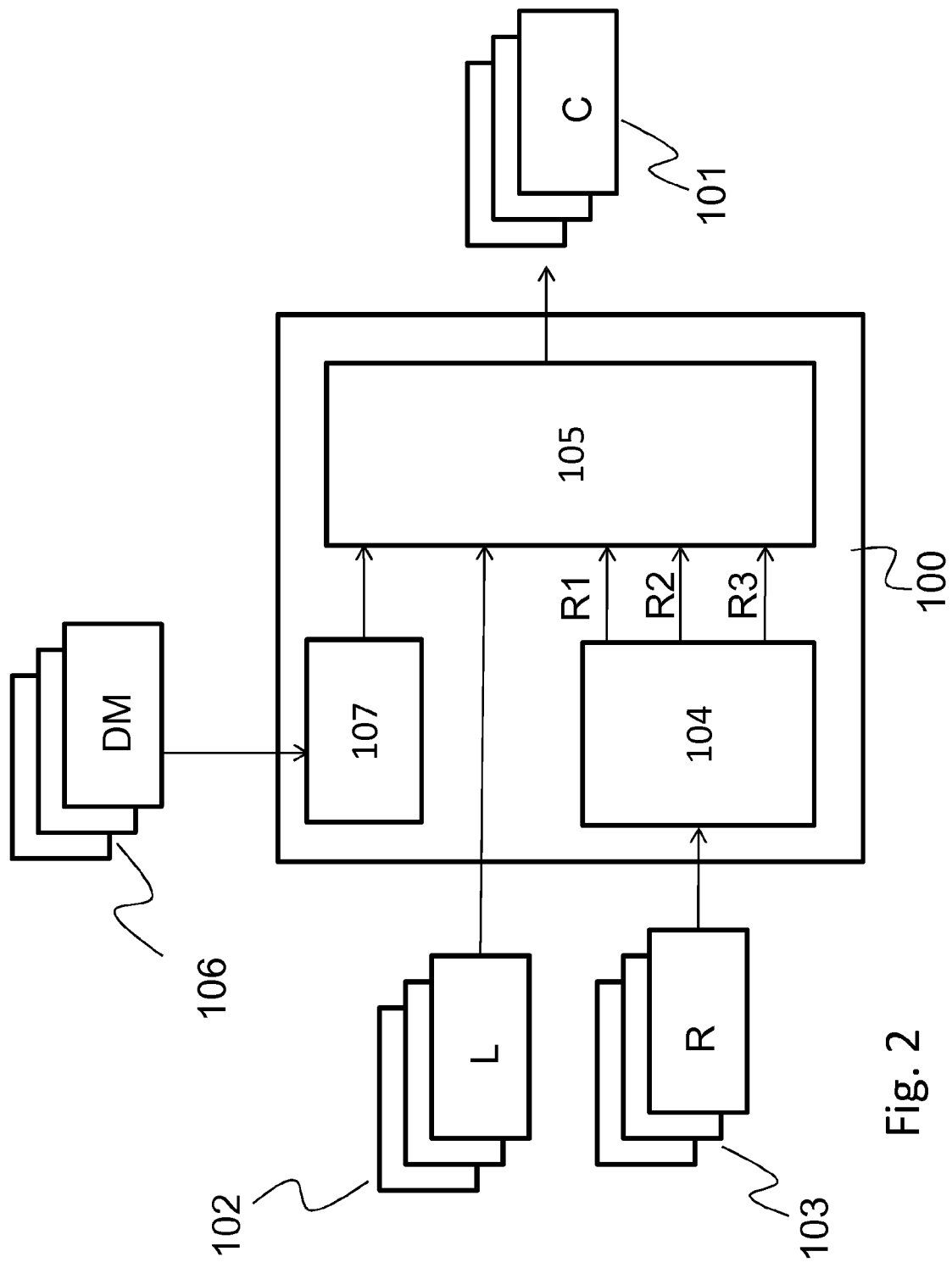
FIG. 2 shows a block diagram of a device for multiplexing the right image, the left image and a depth map into a composite image.

FIG. 2 shows a block diagram of a device 100 for generating a stereoscopic video stream 101 with at least one depth map, in accordance with the variants of the invention.

In FIG. 2, the device 100 receives two sequences of images 102 and 103, e.g., two video streams respectively intended for the left eye (L) and for the right eye (R), as well as a sequence of depth maps 106 relating to the three-dimensional content associated with the stereoscopic video stream.

The depth map of the sequence 106 may be associated with one of the two right and left images respectively belonging to the sequences 102 and 103, or it may be created as an interpolation between the depth maps for the right and left images, i.e., relating to an intermediate viewpoint of the scene.

In this first embodiment, which will be described below, the depth map is generated through any one of the algorithms already known in the art, which are based, for example, on a comparison between a right image and a left image, and which return a matrix (i.e., the depth map), the size of which is equal to the pixels of one of the two compared images, and the elements of which have a value which is proportional to the depth of each pixel of said image. Another depth map generation technique is based on measuring the distance of the object in the scene from the pair of video cameras that are shooting the scene: this distance can be easily measured by means of a laser. In the case of artificial video streams generated with the help of electronic computers, the video cameras are virtual ones, in that they consist of two points of view of a certain scene artificially created by a computer. In such a case, the depth maps are generated by the computer and are very accurate.

As an alternative to the example of FIG. 2, the depth maps of the sequence 106 may be generated within the device 100. In this case, the device 100, instead of receiving the sequence of depth maps from the outside, comprises a suitable module (not shown in the drawing) which is inputted the images L and R of the sequences 102 and 103 and then calculates the corresponding depth maps.

The device 100 allows to implement a method for multiplexing two images of the two sequences 102 and 103 and the depth map of the sequence 106.

In order to implement the method for multiplexing the right and left images and the depth map, the device 100 comprises a disassembler module 104 for breaking up an input image (the right image in the example of FIG. 1b) into a plurality of subimages, each corresponding to one region of the received image, an undersampling and filtering module 107 for processing the depth map, and an assembler module 105 capable of entering the pixels of received images, including the depth map, into a single composite image to be provided at its output. If no processing of the sequence 106 is necessary, the module 107 may be omitted. This may be the case, for example, when the depth map is laser-generated and has, right from the start, a lower resolution than that of the images L and R.

One example of a multiplexing method implemented by the device 100 will now be described with reference to FIG. 3.

Figure 4:
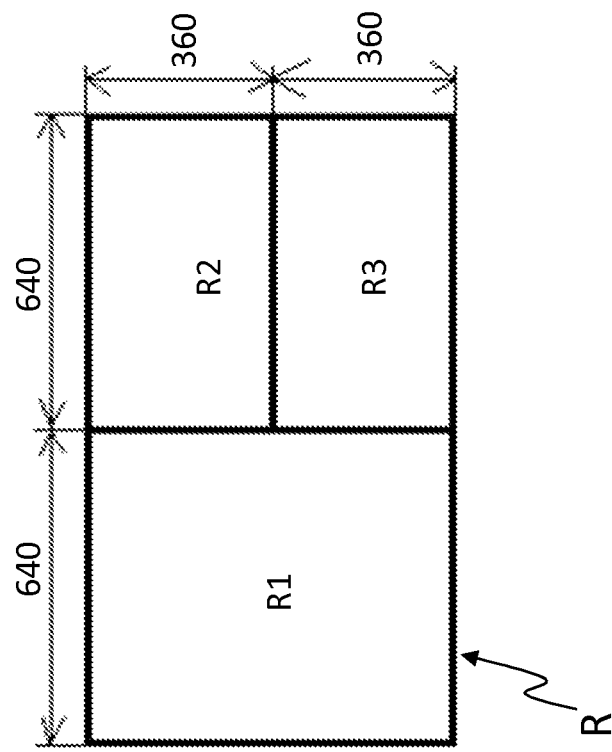
FIG. 4 shows one possible form of disassembly of an image to be entered into a composite image.

The method starts in step 200. Subsequently (step 201), one of the two input images (right or left) is broken up into a plurality of regions, as shown in FIG. 4. In the example of FIG. 4, the disassembled image is a frame R of a 720p video stream, i.e., a progressive format with a resolution of 1280×720 pixels.

The frame R of FIG. 4 comes from the video stream 103 that carries the images intended for the right eye, and is disassembled into three regions R1, R2 and R3, preferably rectangular in shape.

The disassembly of the image R is obtained by dividing it into two portions of the same size and subsequently subdividing one of these portions into two portions of the same size.

The region R1 has a size of 640×720 pixels and is obtained by taking all the first 640 pixels of each row. The region R2 has a size of 640×360 pixels and is obtained by taking the pixels from 641 to 1280 of the first 360 rows. The region R3 has a size of 640×360 pixels and is obtained by taking the remaining pixels of the image R, i.e., the pixels from 641 to 1280 of the last 360 rows.

In the example of FIG. 2, the step of disassembling the image R is carried out by the module 104, which receives an input image R (in this case the frame R) and outputs three subimages (i.e., three groups of pixels) corresponding to the three regions R1, R2 and R3.

Subsequently (steps 202, 203 and 204) the composite image C is constructed, which comprises the information pertaining to both the right and left images and to the depth map received; in the example described herein, said composite image C is a frame of the output stereoscopic video stream, and therefore it is also referred to as container frame.

First of all (step 202), the input image received by the device 100 and not disassembled by the device 105 (the left image L in the example of FIG. 2) is entered unchanged into an undivided area within a container frame, which is sized in a manner such as to include all the pixels of both input images. For example, if the input images have a size of 1280×720 pixels, then a container frame suitable for containing both will be a frame of 1920×1080 pixels, e.g. a frame of a video stream of the 1080p type (progressive format with 1920×1080 pixels).

Figure 1A:
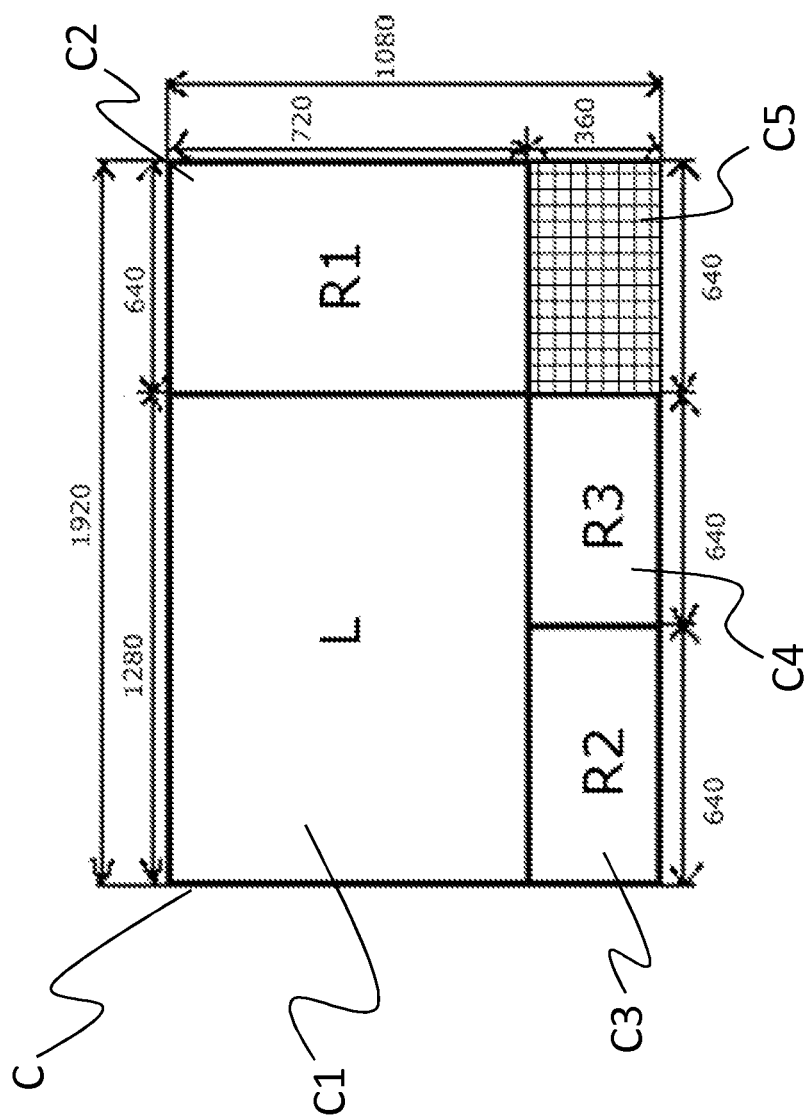
FIG. 1a shows the composite frame in the prior-art format (tile format)

In the example of FIG. 1, the left image L is entered into the container frame C and positioned in the upper left corner.

This is obtained by copying the 1280×720 pixels of the image L into an area C1 consisting of the first 1280 pixels of the first 720 rows of the container frame C.

In the next step 203, the image disassembled in step 201 by the module 104 is entered into the container frame. This is achieved by the module 105 by copying the pixels of the disassembled image into the container frame C in the areas thereof which have not been occupied by the image L, i.e., areas external to the area C1.

In order to attain the best possible compression and reduce the generation of artifacts when decompressing the video stream, the pixels of the subimages outputted by the module 104 are copied by preserving the respective spatial relations. In other words, the regions R1, R2 and R3 are copied into respective areas of the frame C without undergoing any deformation, exclusively by means of translation operations.

Figure 1B:
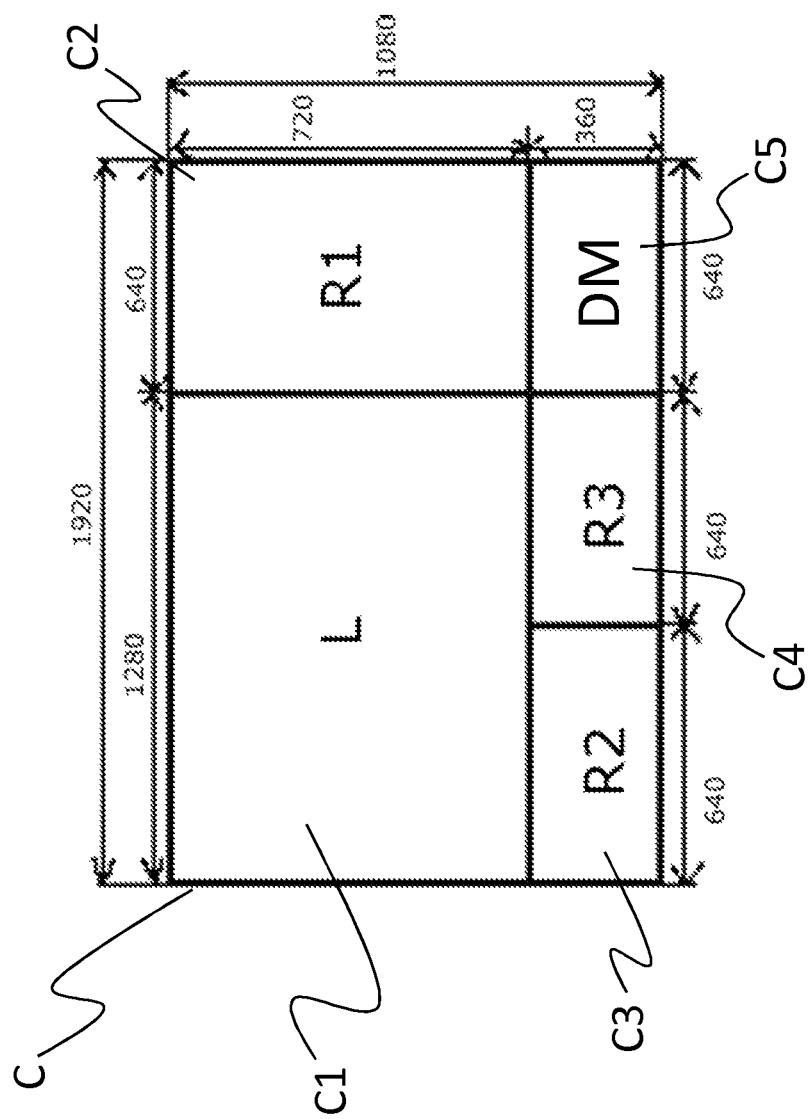
FIG. 1b shows one example of a composite frame according to the present invention.

An example of the container frame C outputted by the module 105 is shown in FIG. 1b.

The region R1 is copied into the last 640 pixels of the first 720 rows (area C2), i.e., next to the previously copied image L.

The regions R2 and R3 are copied under the area C1, i.e., respectively in the areas C3 and C4, which respectively comprise the first 640 pixels and the following 640 pixels of the last 360 rows.

The operations for entering the images L and R into the container frame do not imply any alterations to the balance between horizontal and vertical resolution.

The above-described technique for entering images L and R into the container frame C will hereafter be defined as tile-format type.

In the free pixels of the frame C, i.e., in the area C5, the module 105 enters, in the form of an image, the depth map (DM) pertaining to the stereoscopic pair L and R (step 204). Prior to step 204, the depth map DM may be undersampled, filtered or further processed by the module 107.

The depth map is preferably coded as a grayscale image, the information content of which can therefore be transported by the luminance signal alone; chrominances are not used and may be, for example, null; this allows to obtain an effective compression of the container frame C.

In a preferred embodiment, the depth map DM has a resolution of 640×360 pixels, corresponding to a 4-to-1 undersampling (or decimation) of the original depth map having a resolution of 1280×720 pixels, matching that of the images L and R. Each pixel of the undersampled map DM corresponds to a 2×2 pixel region of the original map. The undersampling operation is typically carried out by using procedures which are per se known in the art.

The frame C thus obtained is subsequently compressed and transmitted or saved to a storage medium (e.g., a DVD). For this purpose, compression means are provided which are adapted to compress an image or a video signal, along with means for recording and/or transmitting the compressed image or video signal.

Figure 5:
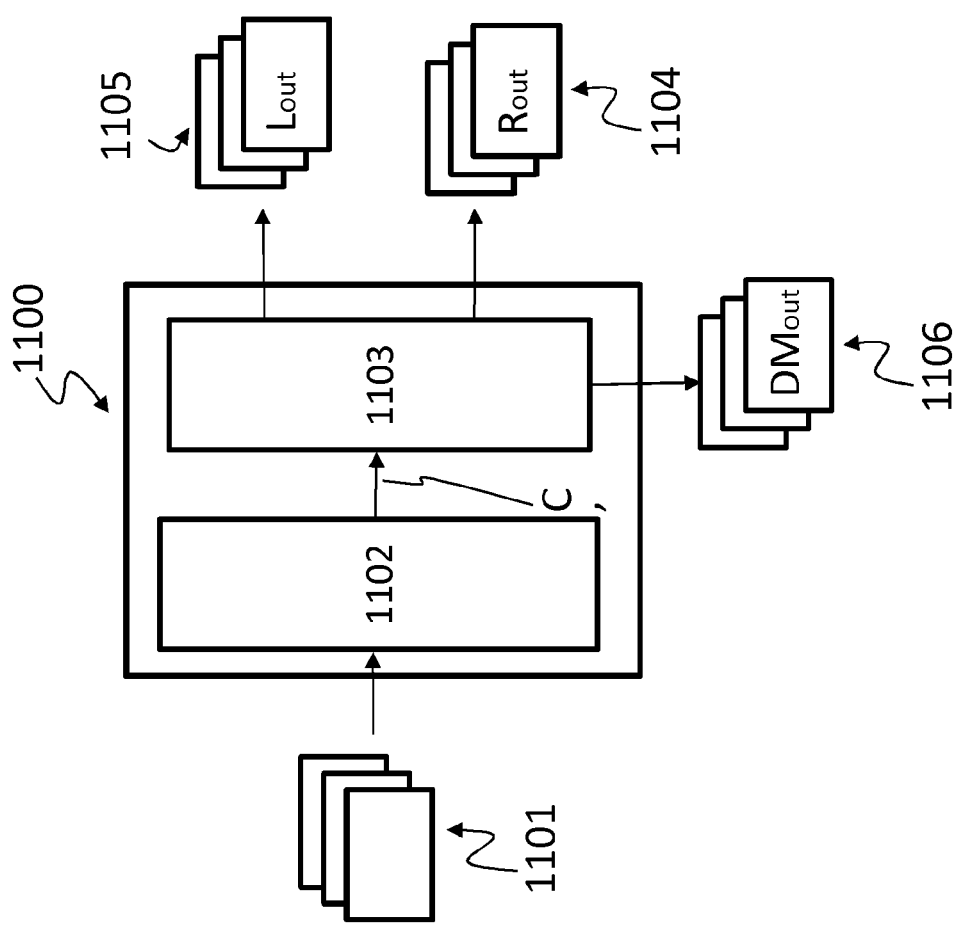
FIG. 5 shows a block diagram of a device for extracting the left image, the right image and a depth map from the composite frame.

FIG. 5 shows a block diagram of a receiver 1100 which decompresses the received container frame (if compressed), reconstructs the two right and left images, and makes them available to a visualization device (e.g., a television set) allowing fruition of 3D contents. The receiver 1100 may be a set-top box or a receiver built in a television set.

The same remarks made for the receiver 1100 are also applicable to a stored image reader (e.g., a DVD reader) which reads a container frame (possibly compressed) and processes it in order to obtain one pair of frames corresponding to the right and left images entered into the container frame (possibly compressed) read by the reader.

Referring back to FIG. 5, the receiver receives (via cable or antenna) a compressed stereoscopic video stream 1101 and decompresses it by means of a decompression module 1102, thereby obtaining a video stream comprising a sequence of frames C' corresponding to the frames C. In case of an ideal channel or if container frames are being read from a mass memory or a data medium (Blu-ray, CD, DVD), the frames C' correspond to the container frames C carrying the information about the right and left images and the depth map, except for any artifacts introduced by the compression process.

These frames C' are then supplied to a reconstruction module 1103, which executes an image reconstruction and depth map extraction method as described below with reference to FIG. 6.

It is apparent that, if the video stream is not compressed, the decompression module 1102 may be omitted and the video signal may be supplied directly to the reconstruction module 1103.

The reconstruction process starts in step 1300, when the decompressed container frame C' is received.

The reconstruction module 1103 extracts (step 1301) the left image L by copying the first 720×1080 contiguous pixels of the decompressed frame into a new frame which is smaller than the container frame, e.g., a frame of a 720p stream. The image L thus reconstructed is sent to the output of the receiver 1100 (step 1302).

The term "contiguous pixels" refers to pixels of an unchanged image belonging to an undivided area of the frame.

Subsequently, the method provides for extracting the right image R from the container frame C'.

The step of extracting the right image (see also FIG. 4) begins by copying (step 1303) the area R1 present in the frame C'. More in detail, the pixels of the 640 columns of R1 are copied into the corresponding first 640 columns of the new frame that represents the reconstructed image Rout. Subsequently, R2 is extracted (step 1304). From the decompressed frame C' (which, as aforesaid, corresponds to the frame C of FIG. 1b), the pixels of the area C3 (corresponding to the source region R2) are selected. At this point, the 640 columns of pixels are copied into the free columns adjacent to those just copied from R1.

As far as R3 is concerned (step 1305), the pixels of the region C4 are extracted from the frame C' and are copied into the last free column in the lower left corner of the reconstructed frame.

At this point, the right image Rout has been fully reconstructed and can be outputted (step 1306).

Finally, the reconstruction module 1103 extracts (step 1307) the depth map by copying into a memory area the luminance values of the last 640×320 pixels of the decompressed container frame C', corresponding to the area C5. The content of said memory area is outputted to the receiver 1100 (step 1302) and will be used by the display for generating interpolated images not transmitted in the stereoscopic video stream. The process for reconstructing the right and left images and the depth map contained in the container frame C' is thus completed (step 1309). Said process is repeated for each frame of the video stream received by the receiver 1100, so that the output will consist of two video streams 1104 and 1105 for the right image and for the left image, respectively, and one video stream 1106 corresponding to the depth map.

The above-described process for reconstructing the right and left images and the depth map for image synthesis is based upon the assumption that the demultiplexer 1100 knows how the container frame C was built and can thus extract the right and left images and the synthesis depth map.

Of course, this is possible if the multiplexing method is standardized.

In order to take into account the fact that the container frame may be generated according to any one of the methods that utilize the solution which is the subject of the appended claims, the demultiplexer preferably uses signaling information contained in the form of metadata in a predefined region of the composite image or in the video stream, which identifies the type of video stream being generated for knowing how to unpack the content of the composite image and how to reconstruct the right and left images and the depth map for the synthesis of supplementary stereoscopic images.

After having decoded the signaling, the demultiplexer will know the position of the unchanged image (e.g., the left image in the above-described examples), as well as the positions of the regions into which the other image was disassembled (e.g., the right image in the above-described examples) and the position of the depth map.

With this information, the demultiplexer can extract the unchanged image (e.g., the left image) and the depth map and reconstruct the disassembled image (e.g., the right image).

Although the present invention has been illustrated so far with reference to some preferred and advantageous embodiments, it is clear that it is not limited to such embodiments and that many changes may be made thereto by a man skilled in the art wanting to combine into a composite image two images relating to two different perspectives (right and left) of an object or a scene and the associated depth map.

In a possible variant, for example, instead of entering into the composite frame C the depth map relating to one of the two images, a so-called "disparity map" or "displacement map" is entered. Under suitable hypotheses (shooting with video cameras equipped with identical optics), such a map can be easily derived from the depth map, with which it can be easily related. If the two right and left images are displayed superimposed on the same display and glasses are not used to separate them, one can easily realize that in order to obtain one image from the other it is necessary to move the objects by a certain quantity. More precisely, in order to obtain the right image starting from the left image it is necessary to move the objects situated behind the screen towards the right by a quantity that increases with the depth at which such objects are located. The objects which are located exactly on the screen do not need to be moved, while the objects located in front of the screen need to be moved to the left by a quantity that increases as a function of the distance from the screen.

In the previously mentioned conditions, between depth P and disparity D a relation of the following type exists:

$$D=I*P/(P+P0)$$

where I is the interocular distance and P0 is the distance of the viewer from the screen. It should be noted that, for P tending to infinity, D will tend to I, and for P=0 (objects located on the screen) D will be equal to 0.

Of course, in order to reconstruct an intermediate image between the left and the right image, it is possible to adopt the same procedure described above, but the disparity values will have to be multiplied by a coefficient c between 0 and 1, which is a function of the distance of the intermediate viewpoint from the viewpoint of the reference image (the left one in this case).

It should be noted that, when the right image is reconstructed by starting from the left one in accordance with the above description, or when an intermediate image is reconstructed, some areas are left uncovered, which correspond to the pixels of objects present in the right image but not in the left image, since they are shadowed by other objects in front of them (the so-called "occlusions").

In order to make a complete reconstruction of an intermediate image, it would therefore be necessary to have available both the right and left images as well as both the depth or disparity maps. In this manner, in fact, the empty (occluded) areas can be filled by taking the corresponding pixels from the other image and by moving them by a quantity equal to the relative disparity multiplied by the coefficient 1−c.

As can be understood from the above description, another possible variant of the invention may require the entry of two depth or disparity maps, instead of one. Such maps, respectively referring to the left image and to the right image, can be entered into the same space where a single map was entered in the preceding case, by using known frame-packing techniques such as, for example, side-by-side or top-and-bottom. In the former case the horizontal resolution of both maps is further halved, whereas in the latter case the vertical resolution is halved. It is also possible to use a further variant of the frame-packing technique defined above as "tile-format".

The procedures for entering the two maps on the generation side and for extracting the two maps on the reception side can be easily derived from those described with reference to the single-map case, with obvious variations well known to those skilled in the art.

Of course, the signaling present in the video stream must also be able to discern the presence of one or two maps. Consequently, said signaling must contain information adapted to allow distinguishing between at least two of the following types of composite frames:

1) composite frame of the tile-format type without depth or disparity maps (case of FIG. 1*a*);
2) composite frame of the tile-format type with one depth or disparity map (case of FIG. 1*b*);

and possibly also:

3) composite frame of the tile-format type with two depth or disparity maps in top-and-bottom configuration;
4) composite frame of the tile-format type with two depth or disparity maps in side-by-side configuration;
5) composite frame of the tile-format type with two depth or disparity maps in tile-format configuration.

The receiver preferably comprises one or more processing blocks adapted to carry out one or more of the following operations, based on the signaling information:

recognizing the type of frame being received, for the purpose of properly reconstructing the two right and left images of the three-dimensional video content, as described above;

recognizing the presence of one or two depth or disparity maps and the type of configuration thereof;

if there are two depth or disparity maps, obtaining each one of the two maps;

performing, on the depth or disparity maps, operations adapted to bring the dimensions of the maps to values equal to those of the images of the video content. These operations may be, for example, of a type inverse to undersampling, e.g., interpolation operations.

Other variants may concern the physical implementation of the invention. For example, the electronic modules that implement the above-described devices, in particular the device 100 and the receiver 1100, may be variously subdivided and distributed; furthermore, they may be provided in the form of hardware modules or as software algorithms implemented by a processor, in particular a video processor equipped with suitable memory areas for temporarily storing the input frames received. These modules may therefore execute in parallel or in series one or more of the video processing steps of the image multiplexing and demultiplexing methods according to the present invention. It is also apparent that, although the preferred embodiments refer to multiplexing two 720p video streams into one 1080p video stream, other formats may be used as well.

Figure 3:
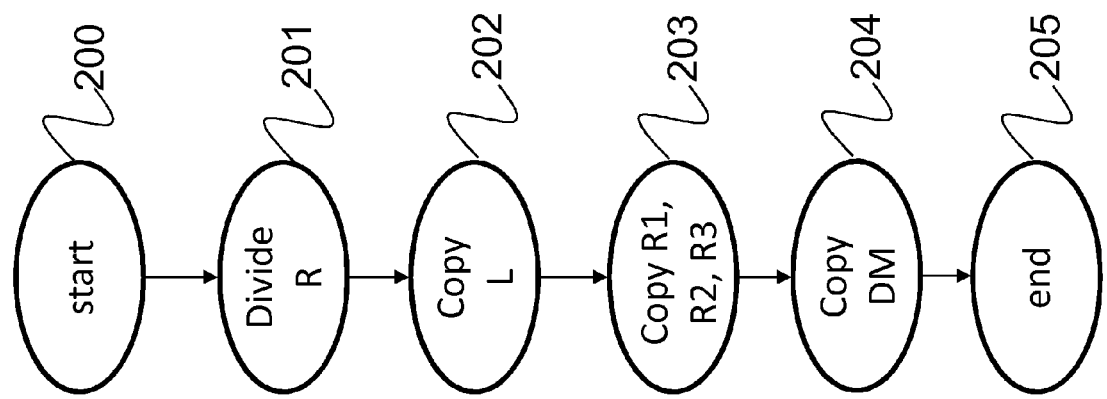
FIG. 3 is a flow chart of a method executed by the device of FIG. 2.
Figure 6:
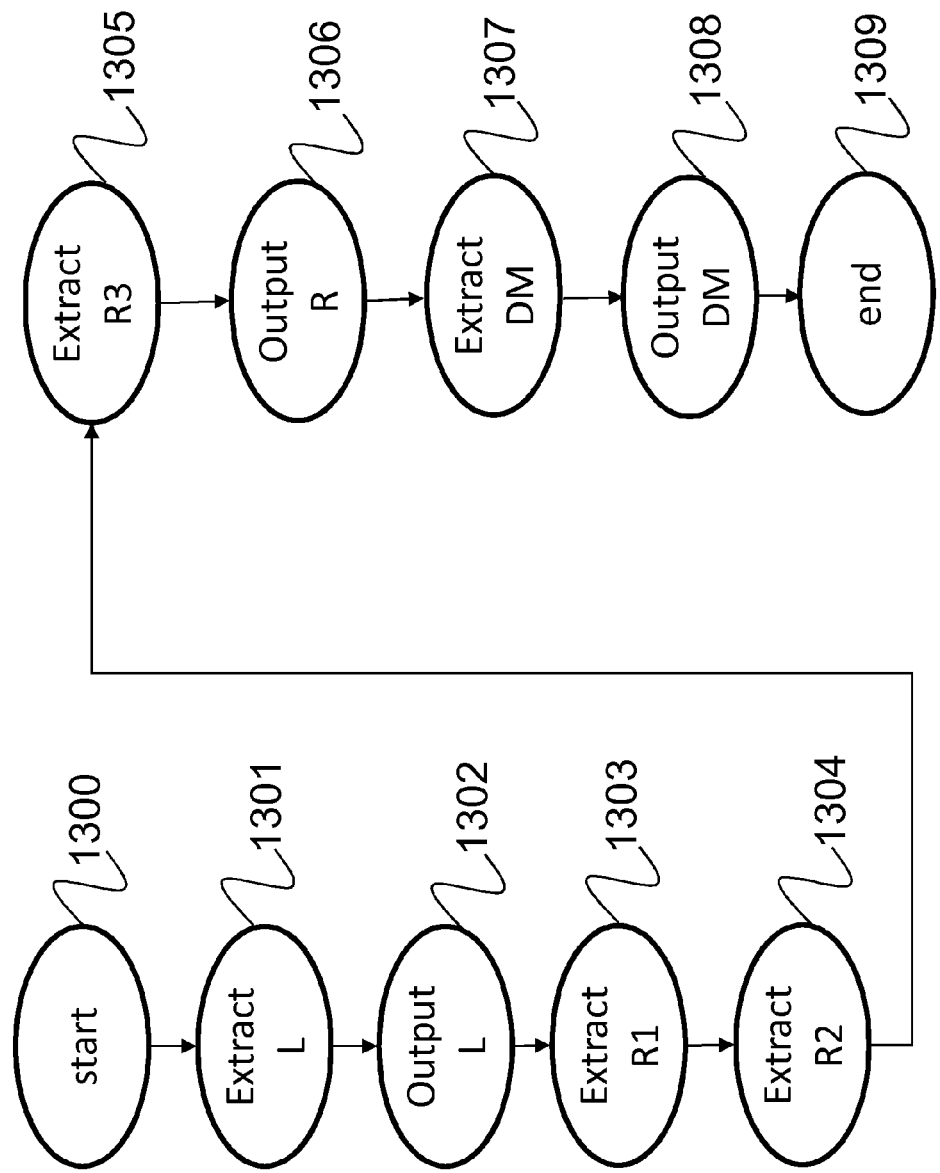
FIG. 6 is a flow chart of a method executed by the device of FIG. 5.

It is obvious that the order in which the multiplexing and demultiplexing procedures shown in FIGS. 3 and 6 are executed is merely exemplificative: it can be modified for any reason, without changing the essence of the method.

Nor is the invention limited to a particular type of arrangement of the composite image, since different solutions for generating the composite image may offer specific advantages and/or disadvantages.

The invention, with all its variants, proposes a universal format for generating, transporting and reproducing 3D contents on any type of current or future display.

In the case of a 2D reproduction device, the video processor of the reproduction device will simply discard the images R and the depth maps (DM or DM1 and DM2) that may be present at the output of the receiver 1100 and will display, subject to scaling, only the sequence of images L on an associated visualization device.

The same applies to the case of a 3D reproduction device in which the user has activated the 2D display mode.

A 3D reproduction device in which the 3D display mode has been activated may show two different behaviors, depending on whether the depth of the scene can be adjusted (decreased) or not. In the former case, the video processor will use the two sequences of images L and R to generate the three-dimensional effect. In the latter case, the video processor will use the depth maps (one or two) included in the composite frames C' associated with each pair of stereoscopic images R and L to generate intermediate views between L and R, thereby obtaining three-dimensional images having a variable depth, lower than that attainable from L and R.

The last case is represented by self-stereoscopic players, which need a very large number of views (a few tens) to generate the three-dimensional effect for viewers positioned at different points in the space in front of the display. In this case, the video processor will use the depth maps (one or two) included in the composite frames C', along with the images L and R themselves, to synthesize a series of other images. In front of the display there are a number of lenses or barriers, such that at any point in space where stereoscopic vision in possible the viewer will perceive just one pair of said images.

Therefore the video processor of the reproduction device may comprise means adapted to send to the display two sequences of images, at least one of which consists of images synthesized by starting from at least one of the transmitted views and from at least one depth map. In this case, it preferably also comprises means adapted to give the viewer the possibility of choosing sequences of images relating to more or less close viewpoints, so as to vary the perception of depth.

The video processor of the reproduction device may also comprise means adapted to generate further images corresponding to further views, so that the viewers positioned at different points in space can see different sequences of images through an associated self-stereoscopic display.

None of the formats proposed until now offers such flexibility and breadth of use, while at the same time still ensuring a very good reproduction quality in terms of balance of the horizontal and vertical resolution and of proper resolution assignment to the stereoscopic images and to the associated depth maps.

The above-described reconstruction operations may take place partly in the receiver device and partly in the display device.

The present invention can advantageously be at least partly realized through computer programs comprising coding means for implementing one or more steps of the above-described methods, when such programs are executed by a computer. It is therefore understood that the protection scope extends to said computer programs as well as to computer-readable means that comprise recorded messages, said computer-readable means comprising program coding means for implementing one or more steps of the above-described methods, when said programs are executed by a computer. The above-described embodiment example may be subject to variations without departing from the protection scope of the present invention, including all equivalent designs known to a man skilled in the art.

The elements and features shown in the various preferred embodiments may be combined together without however departing from the protection scope of the present invention.

From the above description, those skilled in the art will be able to produce the object of the invention without introducing any further implementation details.

The invention claimed is:

1. A method for reconstructing at least one pair of images of a stereoscopic video stream starting from a composite image, said composite image comprising information about a right image, a left image, and a further region, the method comprising the steps of:
    generating a first image of said right and left images by copying a single group of contiguous pixels from a first region of said composite image,
    generating a second image of said right and left images by copying other groups of contiguous pixels from a number of distinct regions of said composite image, said number of distinct regions being different from said first region;
    generating at least one depth or disparity map by copying at least one group of contiguous pixels from said further region of said composite image, different from said first region and from said number of distinct regions, said further region having horizontal and vertical dimensions which are half the dimensions of said right and left images, said at least one depth or disparity map having horizontal and vertical resolution equal to half the resolution of said right and left images,
    reading said at least one depth or disparity map, said depth or disparity map being map associated with one of said right and left images, and
    using said at least one depth or disparity map and at least one of said right and left images for reconstructing an intermediate image between said left and right images.

2. The method according to claim 1, wherein, if said number of regions is three:

one of said regions of the composite image has the same vertical dimension as said first region and half its horizontal dimension;

the remaining two of said regions of the composite image have equal horizontal and vertical dimensions, and half the vertical dimension of said first region.

3. The method according to claim 1, wherein said at least one depth or disparity map is generated by starting from a grayscale image derived from a luminance signal contained in the contiguous pixels of said further region.

4. The method according to claim 3, comprising the step of increasing the horizontal and vertical dimensions of said at least one depth or disparity map up to a dimension equal to that of said right and left images.

5. The method according to claim 1, comprising the step of obtaining, from said composite image or from the video stream, signaling information adapted to recognize the type of video stream being generated.

6. The method according to claim 5, wherein said signaling information is so adapted as to allow distinguishing between at least two of the following types of composite frames:
composite frame of the tile-format type without depth maps;
composite frame of the tile-format type with one depth map;
composite frame of the tile-format type with two depth maps in side-by-side configuration;
composite frame of the tile-format type with two depth maps in top-and-bottom configuration;
composite frame of the tile-format type with two depth maps in tile-format configuration.

7. A device for reconstructing at least one pair of images of a stereoscopic video stream starting from a composite image, said composite image comprising information about a right image, a left image, and a further region, the device comprising:
means for generating a first image of said right and left images by copying a single group of contiguous pixels from a first region of said composite image,
means for generating a second image of said right and left images by copying other groups of contiguous pixels from a number of distinct regions of said composite image, said number of distinct regions being different from said first region;
means for generating at least one depth or disparity map by copying at least one group of contiguous pixels from said further region of said composite image, different from said first region and from said number of distinct regions, said further region having horizontal and vertical dimensions which are half the dimensions of said right and left images, said at least one depth or disparity map having horizontal and vertical resolution equal to half the resolution of said right and left images,
means for reading at least said at least one depth or disparity map, said depth or disparity map being associated with one of said right and left images, and
means for reconstructing an intermediate image between said left and right images basing on said at least one depth or disparity map and said one of said left and right images.

8. The device according to claim 7, wherein, if said number of regions is three:
one of said regions of the composite image has the same vertical dimension as said first region and half its horizontal dimension;
the remaining two of said regions of the composite image have equal horizontal and vertical dimensions, and half the vertical dimension of said first region.

9. The device according to claim 7, wherein said means for generating at least one depth or disparity map utilize a grayscale image derived from a luminance signal contained in the contiguous pixels of said further region.

10. The device according to claim 9, comprising means for increasing the horizontal and vertical dimensions of said at least one depth or disparity map up to a dimension equal to that of said right and left images.

11. The device according to claim 7, comprising means adapted to recognize the type of video stream being received based on signaling information identifying said stream type, contained in said composite image or in said video stream.

12. The device according to claim 11, wherein said signaling information allows distinguishing between at least two of the following types of composite frames:
composite frame of the tile-format type without depth maps;
composite frame of the tile-format type with one depth map;
composite frame of the tile-format type with two depth maps in side-by-side configuration;
composite frame of the tile-format type with two depth maps in top-and-bottom configuration;
composite frame of the tile-format type with two depth maps in tile-format configuration.

13. The device according to claim 12, comprising means which, based on said information useful for distinguishing a type of composite frame, are adapted to output:
only said first image of said right and left images; or
said first one and a second one of said right and left images; or
said first one and said second one of said right and left images and said at least one depth or disparity map.

14. The device according to claim 11, comprising means for carrying out one or more of the following operations, based on said signaling information:
recognizing the type of frame being received, for the purpose of properly reconstructing the two right and left images of the three-dimensional video content;
recognizing the presence of one or two depth or disparity maps and the type of configuration thereof;
in case of two depth or disparity maps, obtaining each one of the two maps;
performing, on said depth or disparity maps, operations adapted to bring the dimensions of the maps to values equal to those of the images of the video content.

15. The device according to claim 7, comprising means so for generating further images corresponding to further views by starting from said right and left images and by using said depth maps.

16. The device according to claim 15, comprising means for displaying two sequences of images, at least one of which comprising images synthesized by starting from at least one of the transmitted views and from at least one depth map.

17. The device according to claim 16, comprising means for giving the viewer the possibility of choosing sequences of images relating to more or less close viewpoints, so as to vary the perception of depth.

18. The device according to claim 15, comprising a self-stereoscopic display, and comprising means for utilizing said further images corresponding to further views in order to allow viewers positioned at different points in space to see different sequences of images.

\* \* \* \* \*